United States Patent
Thoenes et al.

(10) Patent No.: US 6,310,864 B1
(45) Date of Patent: *Oct. 30, 2001

(54) VOICE ECHO CANCELLATION FOR SVD MODEMS

(75) Inventors: Edward Arthur Thoenes, St. Petersburg; Anthony Aristides Tzouris, Clearwater, both of FL (US)

(73) Assignee: Paradyne Corporation, Largo, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/878,882

(22) Filed: Jun. 19, 1997

(51) Int. Cl.[7] .................. H04B 3/20; H04B 1/38
(52) U.S. Cl. ......................... 370/286; 375/222
(58) Field of Search .................. 370/286, 426, 370/468, 485, 289, 352, 493, 495; 375/219, 220, 216, 222, 226; 379/93.08, 406

(56) References Cited

U.S. PATENT DOCUMENTS

| | | | |
|---|---|---|---|
| 4,613,731 | 9/1986 | Godard | 179/170.2 |
| 4,970,715 | 11/1990 | McMahan | 370/286 |
| 5,189,664 | 2/1993 | Cheng | 370/32.1 |
| 5,206,854 | 4/1993 | Betts et al. | 370/286 |
| 5,319,636 | 6/1994 | Long et al. | 370/32.1 |
| 5,406,552 | 4/1995 | Long et al. | 370/32.1 |
| 5,418,778 | 5/1995 | Cummiskey et al. | 370/32.1 |
| 5,475,691 | * 12/1995 | Chapman et al. | 370/527 |
| 5,506,866 | * 4/1996 | Bremer et al. | 375/216 |
| 5,513,212 | * 4/1996 | Bremer | 375/222 |
| 5,617,423 | * 4/1997 | Li et al. | 370/426 |
| 5,659,581 | * 8/1997 | Betts et al. | |
| 5,684,825 | * 11/1997 | Ko | 375/222 |
| 5,974,138 | * 10/1999 | Sambhwani et al. | 379/373 |

OTHER PUBLICATIONS

S.L. Gray, "Network Echo Cancelation With The WE DSP16 Family Of Digital Signal Processors," Nov., 1988, pp. 1–32.

* cited by examiner

*Primary Examiner*—Melvin Marcelo
*Assistant Examiner*—Chiho Andrew Lee
(74) *Attorney, Agent, or Firm*—Scott A. Horstemeyer; Thomas, Kayden, Horstemeyer & Risley (57) ABSTRACT

Disclosed is a circuit and method that eliminates the problem of voice echo created by the use of simultaneous voice and data (SVD) modems in a remote office application. In the instant invention, a voice signal originates in a remote office telephone and is modulated with a data signal and sent from a first SVD modem to a second SVD modem, where it is demodulated and then routed from the second SVD modem back into the switching network to a second telephone where a voice echo signal may be created by existing hybrid transformers. This echo signal will follow the return path of the voice signal to the second SVD modem where it is modulated with a data signal, sent back to the first SVD modem, demodulated, and then routed back to the remote telephone. The echo and voice signal is thus delayed by the modulation and demodulation of the voice and data signals in both SVD modems by a time period of greater than thirty-five milliseconds. The result is an intolerable and disruptive echo signal that is perceived by the person speaking in the remote which is eliminated by the introduction of voice echo cancellation in the circuit.

17 Claims, 5 Drawing Sheets

VOICE ECHO CANCELLATION FOR SVD MODEMS

FIELD OF THE INVENTION

The present invention generally relates to echo cancellation, and more particularly, to echo cancellation in conjunction with simultaneous voice and data modems.

BACKGROUND OF THE INVENTION

The current general workforce faces numerous obstacles in conducting daily work activities. Increased population often means greater traffic on the nation's highways resulting in longer commutes and greater pollution. Also, economic conditions often require both parents of many families to work in order to make ends meet. This means parents are not at home to take care of children. This problem is even greater in single parent homes. When a child gets sick, parents must take a day off from work to tend to the child, losing both valuable business and vacation time.

Fortunately, current technology is providing options for employers and the workforce to accommodate these realities. One such solution is to move the workplace into the home. Modern communications technology is aimed, in part, at facilitating this move. A specific instance involves the use of simultaneous voice and data (SVD) modems to allow the operation of a personal computer and a telephone at home in communication with similar equipment in the workplace. In this case, voice and data signals are modulated together by an SVD modem at a remote site and sent over telephone lines to a second SVD modem at the workplace. The second SVD modem will demodulate the voice and data signal for use at the workplace. In particular, the voice signal may be sent to another extension at the workplace to communicate with other workers or to another telephone outside of the workplace to communicate with customers or other interested parties.

It is at this point that an old problem inherent in the structure of the telecommunications system can degrade the quality of the voice signal transmitted in this manner. Many telephones use two wires with which to send and receive voice signals. Typically, the public-switching telephone network will route these voice signals over two wire pairs. Four wire transmission uses a two wire pair to receive a voice signal, and another two wire pair to send a signal. Consequently, at some point, the signal must be converted from four wire to two wire and vice versa. This is commonly achieved with the use of a hybrid transformer.

A problem that accompanies the use of such transformers is the creation of so called "talker echo" due to an impedance mismatch in the transformers. When a voice signal is sent by a telephone transmitter, the hybrid transformer will reflect the same signal back to the same telephone where it is heard in the receiver. The signal that is heard in the receiver will be delayed depending on how long the signal takes to complete the round trip. Consequently, the talker will hear their own voice as they speak, only delayed by a finite period of time, i.e. they will hear an "echo" of their voice.

Modern telecommunications companies have essentially solved this problem by the introduction of echo cancelers. Echo cancelers essentially subtract a copy of the original signal from the return path so that the echo signal is effectively "canceled out." The echo cancelers are typically placed in the long distance components of the public-switching telephone network ("PSTN"). These cancelers typically activate where echo signals occur with a delay of greater than thirty-five milliseconds.

The use of SVD modems in the remote office configuration as discussed previously creates a new problem relative to echo cancellation. Generally, SVD modems use quadrature amplitude modulation techniques to send data at relatively high baud rates which are desirable in remote office applications. SVD modems transmit both voice and computer data information simultaneously by either analog simultaneous voice and data transmission (ASVD) or digital simultaneous voice and data transmission (DSVD). ASVD modems combine voice and data signals by generally imposing the voice signal on top of the data signal, for example, according to V.61 voice series communication protocol. DSVD modems intersperse a digitally coded representation of the voice into the data stream, for example, according to V.70 protocol for time multiplexing, thereby creating a combined signal to be transmitted across telephone lines. The essential operation of ASVD and DSVD modems as such is an expedient known to those skilled in the art.

The time necessary for the electronic process of modulating or voice coding a combined ASVD or DSVD signal using either of these techniques delays the voice transmission several milliseconds. A similar delay is created when the transmitted signal is received and demodulated by the second SVD modem. These small delays are added together, resulting in an overall delay.

In the remote office or similar environment, hybrid transformers in the network between the second SVD modem and the receiver of the remote office call may reflect an echo signal back to the second SVD modem. If there is no echo cancellation in the PSTN between the receiver and the second SVD modem to cancel this echo signal, as is often the case for local telephone calls, then a delayed echo will be heard by the individual in the remote office. This echo signal can be confusing, tiresome and disruptive, affecting the productivity of employees.

Because of the importance of remote office technology and as a result of the inadvertent creation of disruptive echo signals in the use of SVD modems in the remote office or similar applications, there is a need for an SVD modem with echo canceling capability to be used in a remote office or similar application to eliminate the harmful echo signal.

SUMMARY OF THE INVENTION

Disclosed is a simultaneous voice and data (SVD) modem and method incorporating voice echo cancellation to address the problem of echo signals incurred due to the signal delay unique to SVD modems. In particular, the delay caused by the modulation and voice coding functions of SVD modems whereby an echo signal is made intolerable, but not detectable by existing echo cancellation technology in the public switching telephone network is compensated for by introducing echo cancellation in the SVD modem.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Figure 1:
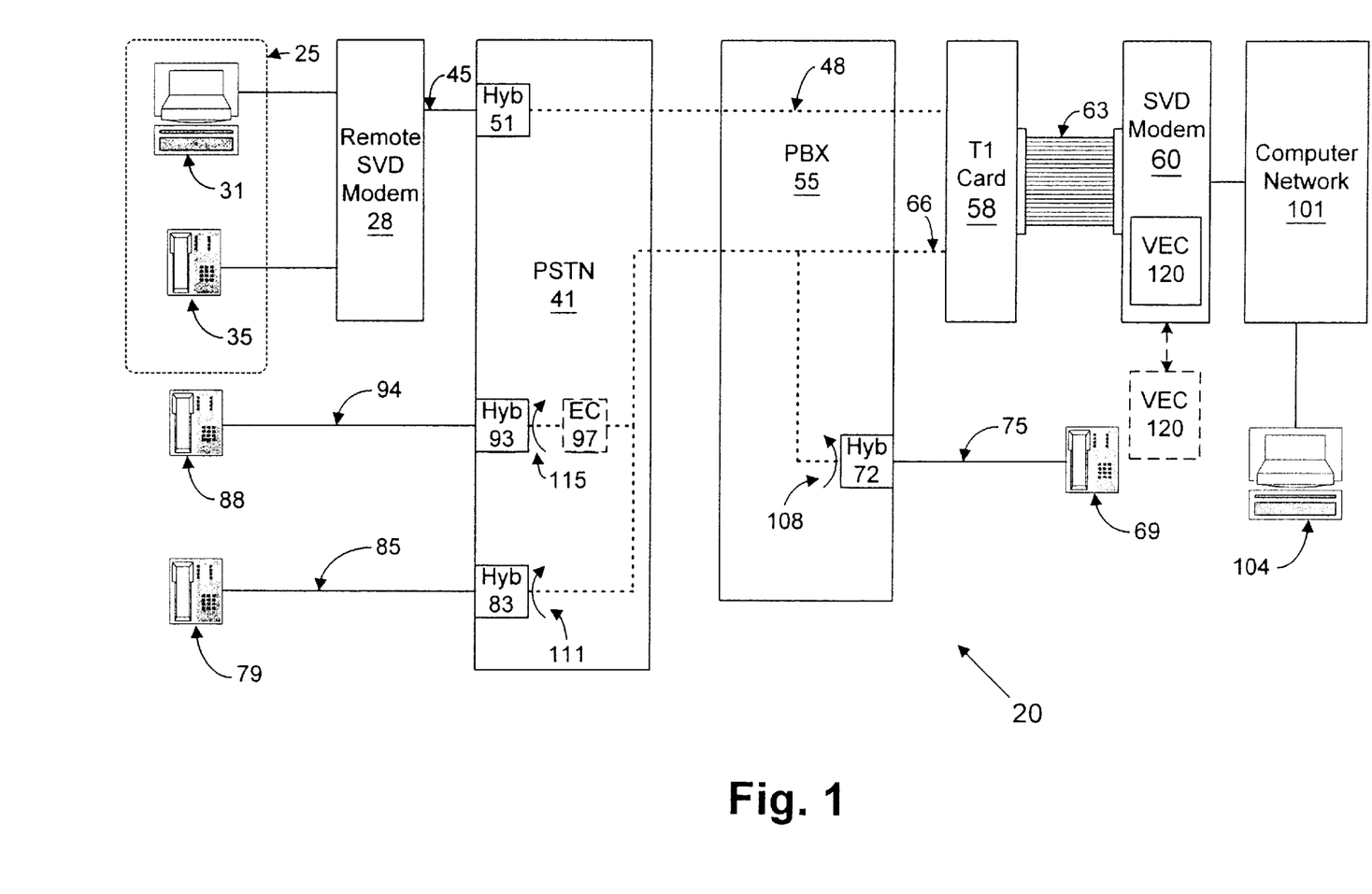
FIG. 1 is a drawing illustrating a remote office network according to the invention.

Referring now to FIG. 1, a remote office network 20 employing simultaneous voice and data modems is shown. In the preferred embodiment, a remote office 25 is shown having a remote simultaneous voice and data ("SVD") modem 28 which is connected to a remote computer 31 and a remote telephone 35. Although the remote office 25 may exist anywhere, its common place is in an employee's dwelling. It would be possible, for example, to combine the remote SVD modem 28 with the remote computer 31 and remote telephone 35 into a single portable unit or laptop which could be carried anywhere.

The remote SVD modem 28 is in turn connected to a public switching telephone network 41 ("PSTN"). Typically, this connection is through a standard two wire line 45 which will be adapted to four wire line 48 by a hybrid transformer 51. A hybrid transformer 51 is placed in the line whenever a two wire signal must be converted to a four wire signal and vice versa as known to those skilled in the art.

The PSTN 41 is in turn connected to the private branch exchange 55 ("PBX"). PBX 55 acts as a switching network that is often used to control the telephones in companies and other similar environments as known to those skilled in the art. The PBX 55 is in turn connected to a T1 interface card 58. The T1 interface card provides an interface between the PBX 55 and the SVD modem 60 by converting the four wire line 48 to a forty conductor ribbon cable 63 which mates up with the SVD modem 60.

In the preferred embodiment, the T1 interface card 58 is linked to the PBX 55 with two four-wire lines 48 and 66. The first line 48 is that through which the link is established with the remote SVD modem 28 as discussed previously. The second four wire line 66 is used to route a demodulated voice signal back to the PBX 55 that has been separated from the original combined voice and data signal received from the remote SVD modem 28.

The demodulated voice signal may be routed through the second four wire line 66 to any telephone connected to the PBX 55 and the PSTN 41. In FIG. 1, three telephones are shown. First is the work telephone 69 which is connected to the second four wire line 66 via the hybrid transformer 72 and two wire interface 75. Second is the local telephone 79 which, like the work telephone 69, is also connected to the second four wire line 66 via the hybrid transformer 83 and two wire interface 85. Finally, the demodulated voice signal may be routed to long distance telephone 88 through the hybrid transformer 93 and two wire interface 94. Note that the three different telephone connections outlined above are exclusive in that only one will be connected to the SVD modem 60 via the PSTN 41 and/or the PBX 55 at a given time.

Also note that the link to the long distance telephone 88 differs from the work telephone 69 and the local telephone 79 in that the PSTN 41 may introduce an echo canceler 97 in the line. The echo canceler will eliminate an echo signal if a time delay of over thirty-five milliseconds is incurred in the transmission due to switching and line propagation as known by those skilled in the art as will be discussed.

In the preferred embodiment the SVD modem 60 is also electrically connected to a computer network 101, to which the work computer 104 is linked. Through this connection, the remote computer 31 has access to the computer network 101 and information on the work computer 104.

The operation of the remote office network as described above is as follows. The remote SVD modem 28, having creating a combined voice and data signal from both the remote computer 31 and the remote telephone 35, communicates through the PSTN 41 and the PBX 55 with the SVD modem 60. The SVD modem 60 receives the combined signal and splits it up into both a voice signal and a data signal. The data signal is then routed to the computer network 101 where it may access the work computer 104. Also, any other equipment on the computer network 101 may be accessed as is known to those skilled in the art. The voice signal is routed back to the PBX 55 where it may reach either the work telephone 69, the local telephone 79 or the long distance telephone 88.

Before the voice signal may reach any one of these telephones as illustrated in FIG. 1, the four wire communication 66 must be converted into the two wire communication 75, 85 or 94 using hybrid transformers 72, 83, or 93. Hybrid transformers 72, 83, or 93 will create echo signals 108, 111 or 115 as a result of an impedance mismatch that often occurs during operation. The creation of echo signals 108, 111 or 115 due to an impedance mismatch is a common occurrence well known to those skilled in the art and will not be described in detail. The echo signals 108, 111 or 115 will follow the return path of the voice signal and will be heard by the person speaking on the remote telephone 35. The precise time period that elapses between the time a word is spoken and the time the echo is heard by the speaker is equal to the total time the voice signal is delayed.

In the preferred embodiment, this delay is incurred when the remote SVD modem 28 and the SVD modem 60 combine and separate the voice and data signals. In each instance where the voice and data signals are combined or separated, the signals are delayed by a minimum of approximately forty milliseconds for a total minimum delay of one hundred and sixty milliseconds. In the case of DSVD modems, the total delay may be much greater, even up to 250 milliseconds one way for a total 500 millisecond delay. This delay is defined as a "modem" delay for the purposes of this discussion. The modem delay is not seen by the PSTN 41 or the PBX 55 as it is not related to the signal propagation and switching that occurs in the PSTN 41.

In the preferred embodiment, the echo canceler 120 is configured to cancel an echo with a round trip delay of thirty-five milliseconds or greater with respect to remote telephone 35. It is understood that this delay may involve both delays from modulation and demodulation in modems 28 and 60 as well as any delay incurred due to switching and propagation in the PBX 55 and the PSTN 41. The echo canceler 120 is configured to cancel an echo with a round trip delay of thirty-five milliseconds or greater to comport with existing echo cancellation that is employed in the PSTN 41 as discussed previously.

To explain further, as was discussed briefly, a voice signal that is transmitted over the PSTN 41 will experience a delay due to switching and line propagation as known to those skilled in the art. Generally, when a total delay results greater than thirty-five milliseconds, the PSTN 41 will bring an echo canceler 97 on the line to eliminate what will be an intolerable echo in the telephone receiver as known to those skilled in the art. In the case of the preferred embodiment, the length of the delay by which an echo canceler 97 will be employed is equal to that incurred by the propagation and switching in the PSTN 41 based on the length of the transmission through the PSTN 41 relative to the PBX 55. Generally, local telephone calls will create a delay of less than thirty-five milliseconds and voice echo cancelers will not be employed. Thus in FIG. 1, there is no echo canceler employed to eliminate echoes 108 and 111. This is because the distance to the work telephone 69 and the local telephone 79 from the PBX 55 is relatively short.

Long distance telephone calls will create a much greater delay due to the greater propagation and switching that occurs as known to those skilled in the art. Often, an echo canceler will be placed in the line as is the case with communication with long distance telephone 88 in which echo canceler 97 is employed due to the long distance relative to the PBX 55.

Thus, in the preferred embodiment, telephone communication initiated on the remote telephone 35 to either the work telephone 69 or the local telephone 79 will experience a modem delay of much more than thirty-five milliseconds due to the functions of the SVD modems 28 and 60 as discussed previously. However, the propagation and switching delay as seen by the PSTN 41 relative to the PBX 55 where the PSTN 41 perceives the call as being initiated will be less than thirty-five milliseconds and, consequently, no echo canceler is brought online. The result are intolerable and unacceptable echo signals 108 and 111 heard by the person speaking into the remote telephone 35. In the preferred embodiment, an SVD modem echo canceler 120 is introduced to eliminate the echo created by this situation.

Figure 2:
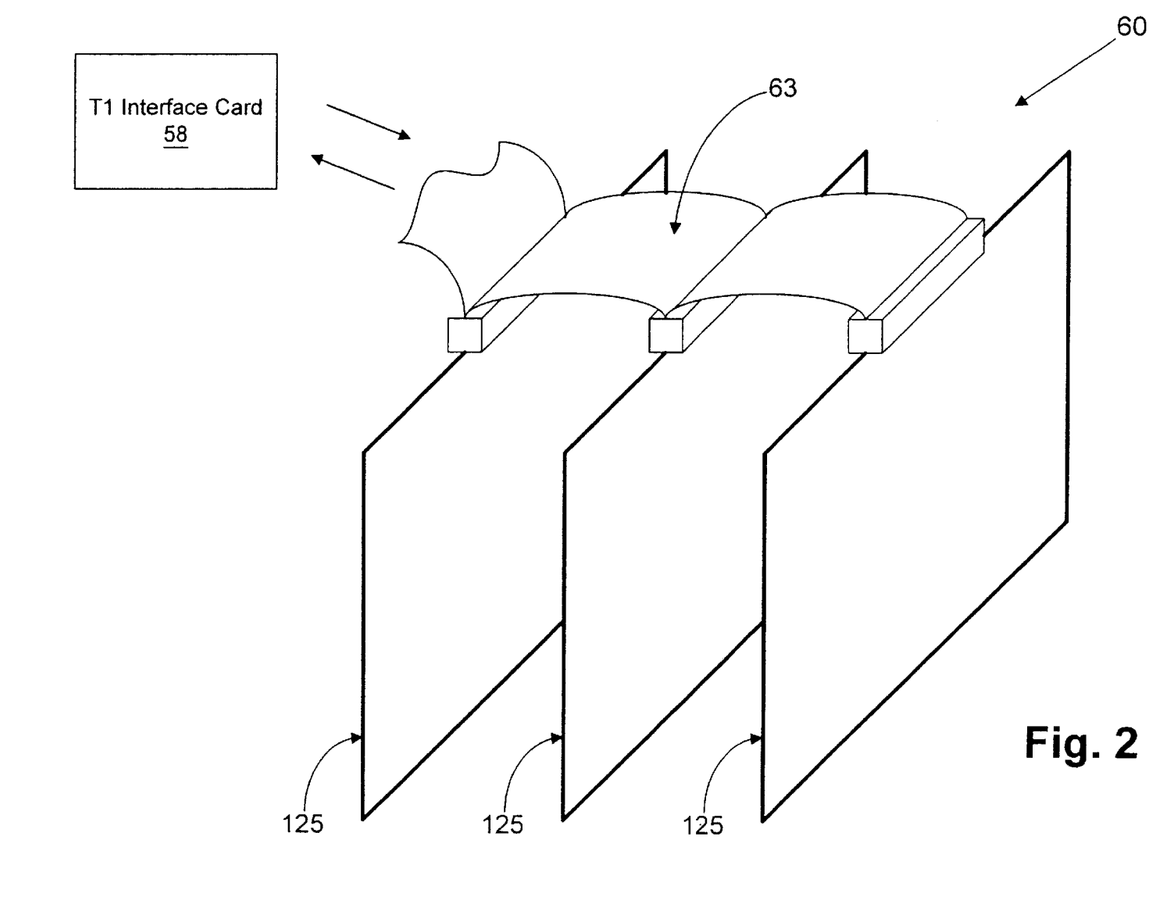
FIG. 2 is a drawing illustrating the interconnection of the Octal Communications Devices inside the SVD modem of FIG. 1.

Referring now to FIG. 2, shown are the basic inner workings of the SVD modem 60 according to the first embodiment. In particular, the forty conductor ribbon cable 63 which originates from T1 interface card 58 also acts as a common bus between three octal communications devices (OCDs) 125. The OCDs 125 are essentially physically identical and perform the functions required by the SVD modem 60.

Figure 3:
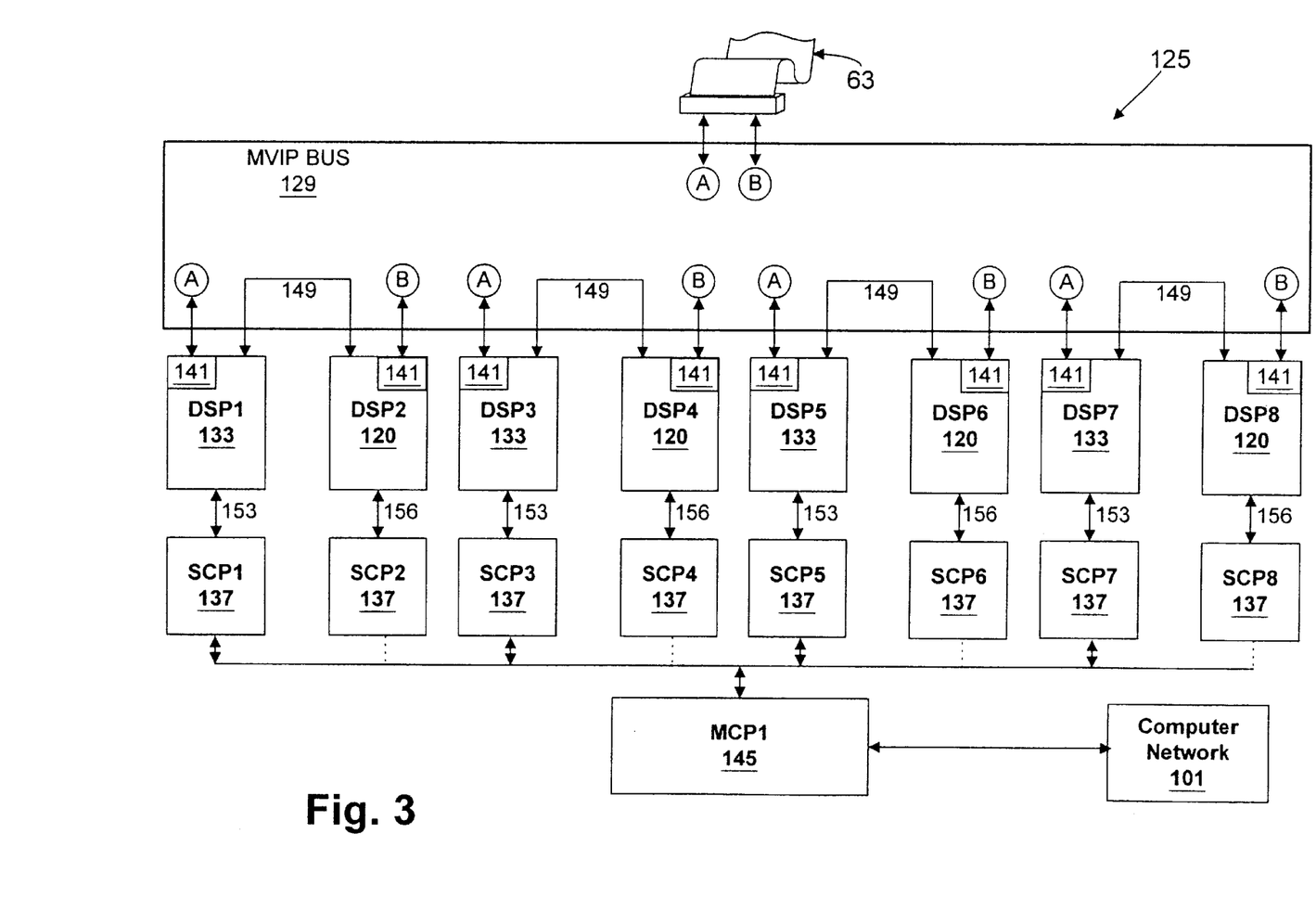
FIG. 3 is a schematic illustrating the operation of an Octal Communications Device of FIG. 2 according to the first embodiment of the invention.

Turning then to FIG. 3, shown is a schematic of an OCD 125 as configured according to the first embodiment of the instant invention. At the top of OCD 125 is the forty conductor ribbon cable 63 as seen in FIG. 2 which provides the electrical connection to the T1 interface card 58 (not shown) through which the combined voice and data signals and the voice signals are received and transmitted. The incoming combined voice and data signal may in actuality comprise multiple signals from multiple remote SVD modems 28 (not shown), each on its own channel. The channels are combined using time division multiplexing as known to those skilled in the art. In the first embodiment, there may be up to 24 channels in the incoming signal.

The forty conductor ribbon cable 63 is in turn connected to the MULTI-VENDOR INTEGRATION PROTOCOL ("MVIP") Bus 129, which is a trademark of Natural Micro-Systems Corporation in Framingham, Mass. The MVIP bus 129 is also termed a switching fabric which can establish a connection between any two input/outputs attached to it. In a sense, the MVIP bus 129 acts as its own switching network essentially providing ports through which the simultaneous voice and data signals and the individual voice signals are transmitted and received. The MVIP bus 129 is electrically connected to the SVD digital signal processors ("SVD DSPs") 133 and the echo canceler DSPs 120 which in turn are in communication with the slave control processors ("SCPs") 137. Resident on the SVD DSPs 133 are Flexible MVIP Interface Circuits ("FMICs") 141, the function of which will be explained. The SCPs 137 are then connected by a common bus to the master control processor ("MCP") 145 which acts as an interface with the host computer network 101 or computer system of FIG. 1 through a data port.

The operation of the components on the OCD 125 is now described. The incoming time division multiplexed signal A is routed to an input port on each SVD DSP 133. Since the signal A consists of several time division multiplexed channels, each SVD DSP 133 must be able to separate an individual channel from the multiplexed signal A for processing. This function is performed by the FMICs 141. To explain further, the multiplexed signal A provides a serial loop of 24 bytes of information corresponding to the 24 channels. The FMICs 141 are configured to choose a particular time slot on the serial loop and thus information corresponding to a single channel will be read into the SVD DSPs 133.

The SVD DSPs 133 then perform the basic function of a simultaneous voice and data modem by splitting the single channel into a voice signal 149 and a data signal 153. This function is also referred to as the "demodulation" of a simultaneous voice and data signal. Conversely, the creation of a simultaneous or combined voice and data signal from both a voice signal 149 and a data signal 153 is defined as "modulation". The voice signal 149 is routed back to the MVIP bus 129 to an echo canceler DSP 120. Although the echo canceler DSPs 120 are physically identical to the SVD DSPs 133, they are programmed to cancel echoes according to the instant invention. Once the voice signal 149 has been processed by the echo canceler DSP 120, the resulting voice signal B is routed back to the forty conductor ribbon cable by the FMICs 141 and the MVIP bus 129 using time division multiplexing techniques to combine the several different voice channels. Ultimately the voice signal is routed to the PBX 55 of FIG. 1 to a particular telephone.

The data signal 153 is routed to a corresponding SCP 137 which in turn sends the data signal to the MCP 145 which acts as an interface with the host computer system. The SCPs 137 also perform control functions as known to those skilled in the art. The SCPs 137 that are connected to the echo canceler DSPs 120 do not transfer data, however, they provide control information 156 downloading code to the echo canceler DSPs 120 and performing other management functions as known to those skilled in the art.

It must be noted that all communications pathways with regard to the multiplexed signals A and resulting voice signal B as well as the voice signal 149 and the data signal 153 described herein are bi-directional as shown in FIG. 3.

Due to the fact that there are four SVD DSPs 133 with four accompanying canceler DSPs 120 in a single OCD 125, the maximum number of voice signals which may be processed by SVD modem 60 (FIG. 1) according to the first embodiment is twelve. Those voice and data signals received in excess of twelve are busied out which is an expedient well known to those skilled in the art.

The echo canceler DSPs 120 run according to voice echo cancellation software similar to that discussed in *Network Echo Cancellation with the WE® DSP* 16 *Family of Digital*

*Signal Processors Application Note,* November 1988, AT&T Technologies, the entire text of which is incorporated herein by reference.

Figure 4A:
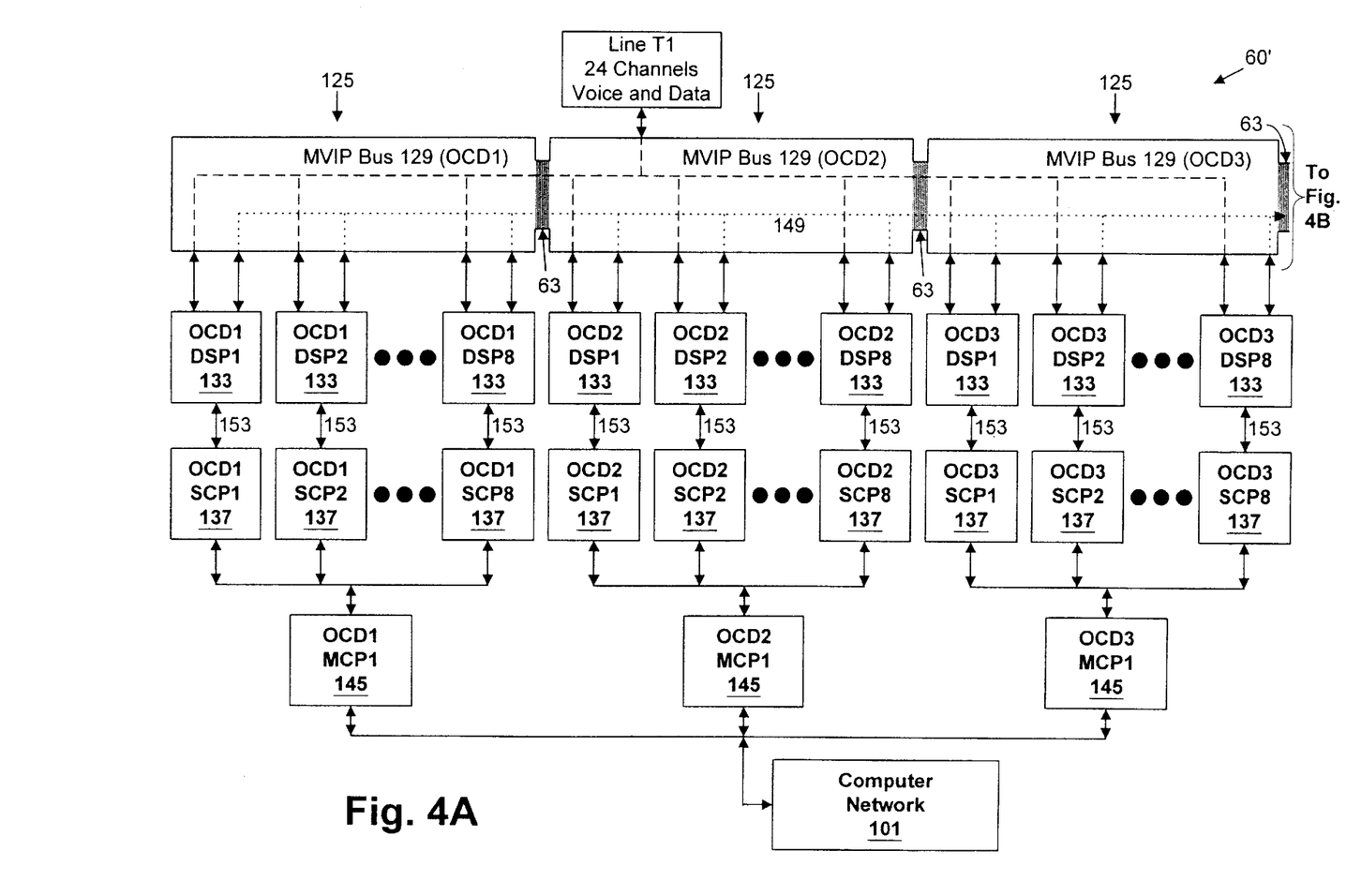
FIG. 4A is a schematic illustrating the operation of three Octal Communications Devices according to the second embodiment of the invention.

The second embodiment of the invention operates in similar fashion to the first embodiment, but has been configured to accommodate a greater number of voice and data channels. Turning to FIG. 4A, shown is part of the second embodiment of the invention. In the second embodiment, a fourth OCD 125 is added to the SVD modem 60'. FIG. 4A shows three of the OCDs 125 each with an MVIP bus 129. The MVIP busses 129 are connected via forty conductor ribbon cables 63. In this configuration, each OCD 125 houses eight SVD DSPs 133 which separate up to 24 incoming voice and data channels as in the first embodiment. The data signal 153 is routed to the SCPs 137 and on to the MCPs 145 to the host CPU 101 as was the case with the first embodiment.

Figure 4B:
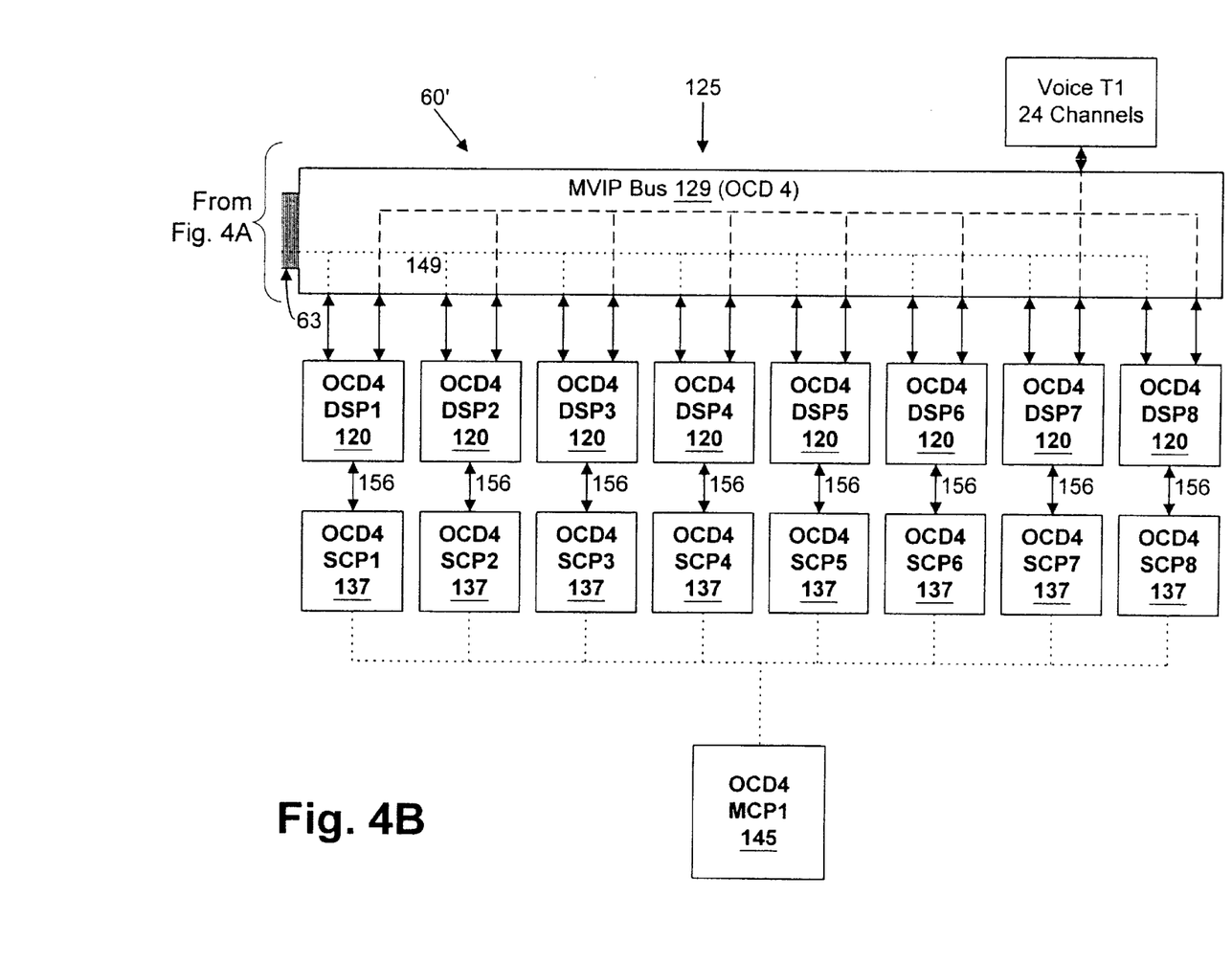
FIG. 4B is a schematic illustrating the operation of a fourth Octal Communications Device according to the second embodiment of the invention.

Turning to FIG. 4B, the voice signals 149 (FIGS. 4A and 4B) are routed by the MVIP busses 129 (FIGS. 4A and 4B) and the ribbon cables 63 (FIGS. 4A and 4B) to the fourth OCD 125. The echo canceler DSPs 120 are all programmed to act as three separate echo cancelers. Thus, the echo canceler DSPs 120 resident on the forth OCD 125 can perform echo cancellation for three separate voice signals 149. Due to this feature, the configuration of the second embodiment of the invention is labeled "triple density" as each echo canceler DSP 120 is programmed to function as three echo cancelers. The configuration of the first embodiment is labeled single density accordingly. Note that the program running on the echo canceler DSP 120 in the second embodiment operates in much the same way as the first embodiment as shown in FIG. 4, however, it is configured to cancel three echo signals on three separate channels.

Another feature of the instant invention is the placement of the voice echo canceler 120 (FIG. 1). In FIG. 1, the voice echo canceler 120 is placed in the SVD modem 60. However, the physical location of the voice echo canceler 120 is not restricted to the interior of SVD modem 60. In fact, the voice echo canceler may be physically located anywhere along the signal path that is created between the remote telephone 35 and any other telephone (i.e. telephones 69, 79 or 88). This would include within the remote SVD modem 28, for example.

Many variations and modifications may be made to the first and second embodiments of the invention without departing substantially from the spirit and principles of the invention. All such modifications and variations are intended to be included herein within the scope of the present invention, as defined by the following claims.

Having described the invention, the following is claimed:

1. A first simultaneous voice and data modem associated with a switching hub of a communications network, comprising:

a modulated voice and data port adapted to transmit and receive a modulated simultaneous voice and data signal to and from a second simultaneous voice and data modem located at an endpoint of said communications network;

a demodulated voice port for transmitting and receiving a voice signal to and from a communications device via a switching network;

a demodulated data port for transmitting and receiving a data signal; and a digital signal processor electrically coupled to said modulated voice and data port and said demodulated voice port, said digital signal processor associated with said first simultaneous voice and data modem for canceling a voice echo originating in said switching network and received by said demodulated voice port, said voice echo experiencing a delay resulting from the modulation and demodulation of said simultaneous voice and data signal in said first simultaneous voice and data modem and said second simultaneous voice and data modem.

2. The modem of claim 1, wherein said delay of said voice echo is in excess of thirty-five milliseconds.

3. The modem of claim 1, wherein said digital signal processor is configured to cancel three voice echoes.

4. A first simultaneous voice and data modem associated with a switching hub of a communications network, comprising:

a first means for transmitting and receiving a modulated simultaneous voice and data signal to and from a second simultaneous voice and data modem located at an endpoint of said communications network;

a second means for transmitting and receiving a voice signal to and from a communications device via a switching network;

a third means for transmitting and receiving a data signal; and a fourth means associated with said first simultaneous voice and data modem for canceling a voice echo originating in said switching network and received by said second means, said voice echo experiencing a delay resulting from the modulation and demodulation of said simultaneous voice and data signal in said first simultaneous voice and data modem and said second simultaneous voice and data modem.

5. The modem of claim 4, wherein said fourth means further comprises a digital signal processor adapted to cancel said voice echo.

6. The modem of claim 4, wherein said delay is in excess of thirty-five milliseconds.

7. A method of electrical communication via a first simultaneous voice and data modem associated with a switching hub of a communications network, comprising the steps of:

transmitting and receiving a modulated simultaneous voice and data signal using said first simultaneous voice and data modem to and from a second simultaneous voice and data modem located at an endpoint of said communications network;

transmitting and receiving a voice signal using said first simultaneous voice and data modem to and from a communications device via a switching network;

transmitting and receiving a data signal using said first simultaneous voice and data modem; and canceling a voice echo originating in said switching network using an echo canceler associated with said first simultaneous voice and data modem, said voice echo experiencing a delay resulting from the modulation and demodulation of said simultaneous voice and data signal in said first simultaneous voice and data modem and said second simultaneous voice and data modem.

8. A system for the communication of voice and data information, comprising:

a first modem associated with a switching hub of a communications network for transmitting and receiving at least one simultaneous voice and data signal having a data signal and a voice signal, said first modem having at least one first signal processor for modulating and demodulating the simultaneous voice and data signal from and into the voice signal and the data signal;

a second modem located at an endpoint of said communications network and in electrical communication with said first modem, said second modem for transmitting and receiving the simultaneous voice and data signal to and from said first modem, said second modem having at least one second signal processor for modulating and demodulating the simultaneous voice and data signal;

at least one echo signal received by said first modem, said echo signal and the voice signal being delayed by said modulation and demodulation performed by said first and second signal processors; and at least one echo canceler in circuit with one of said modems to cancel said echo signal.

9. The system of claim 8, wherein said echo canceler is located in said first modem.

10. The system of claim 8, wherein said echo canceler is located in said second modem.

11. The system of claim 8, wherein said echo canceler is located outside of said first and second modems.

12. The system of claim 8, wherein said first and second signal processors are digital signal processors.

13. The system of claim 8, wherein said delay is in excess of thirty-five milliseconds.

14. The system of claim 8, wherein said first modem further includes at least one digital signal processor programmed to operate as said echo canceler.

15. The system of claim 8, wherein said first modem further includes at least one digital signal processor configured to operate as three of said echo cancelers.

16. A first simultaneous voice and data modem associated with a switching hub of a communications network, comprising:

a modulated input/output through which is received and transmitted a simultaneous voice and data signal;

a demodulated voice input/output through which is received and transmitted a voice signal, said demodulated voice input/output in electrical communication with a communications device via a switching network;

a demodulated data input/output through which is received and transmitted a data signal; and a plurality of digital signal processors connected to said input/outputs, a predetermined number of said processors associated with said first simultaneous voice and data modem for canceling voice echoes created by said switching network and a delay resulting from the modulation and demodulation of said simultaneous voice and data signal.

17. A method of communicating voice and data information, comprising the steps of:

transmitting and receiving a simultaneous voice and data signal between a first simultaneous voice and data modem associated with a switching hub of a communications network and a second simultaneous voice and data modem located at an endpoint of said communications network;

modulating a simultaneous voice and data signal from a voice signal and a data signal in both said modems;

demodulating the simultaneous voice and data signal into the voice signal and the data signal in both said modems;

transmitting and receiving a voice signal to a communications device;

generating an echo signal from the transmission of said voice signal to said communications device, said voice and echo signals signal being delayed by said modulation and demodulation steps; and canceling said echo signal with an echo canceler associated with said first simultaneous voice and data modem.

* * * * *

UNITED STATES PATENT AND TRADEMARK OFFICE
CERTIFICATE OF CORRECTION

PATENT NO. : 6,310,864 B1
DATED : October 30, 2001
INVENTOR(S) : Edward Arthur Thoenes and Anthony Aristides Tzouris It is certified that error appears in the above-identified patent and that said Letters Patent is hereby corrected as shown below:

Column 2,
Line 52, after "network", add -- , --.

Column 4,
Line 15, "creating" should be -- created --.

Column 5,
Line 2, "results" should be -- is --.
Line 33, "result" should be -- results --.

Column 6,
Line 52, "performing" should be -- perform --.

Column 7,
Line 23, "forth" should be -- fourth --.

Column 10,
Lien 32, after "signals" and before "being", delete "signal".

Signed and Sealed this

Twenty-first Day of May, 2002

Attest:

JAMES E. ROGAN
Attesting Officer     Director of the United States Patent and Trademark Office